United States Patent
Lutz

(10) Patent No.: US 7,357,075 B2
(45) Date of Patent: Apr. 15, 2008

(54) LASER-SUPPORTED REPRODUCTION METHOD

(75) Inventor: Norbert Lutz, Rückersdorf (DE)

(73) Assignee: Leonard Kurz GmbH & Co. KG, Furth (DE)

( * ) Notice: Subject to any disclaimer, the term of this patent is extended or adjusted under 35 U.S.C. 154(b) by 361 days.

(21) Appl. No.: 10/524,226

(22) PCT Filed: Aug. 8, 2003

(86) PCT No.: PCT/DE03/02670

§ 371 (c)(1),
(2), (4) Date: Feb. 9, 2005

(87) PCT Pub. No.: WO2004/020176

PCT Pub. Date: Mar. 11, 2004

(65) Prior Publication Data
US 2005/0269303 A1     Dec. 8, 2005

(30) Foreign Application Priority Data

Aug. 9, 2002  (DE) ............................ 102 36 597
Oct. 30, 2002 (DE) ............................ 102 50 476

(51) Int. Cl.
*B44C 1/24* (2006.01)
(52) U.S. Cl. .................. 101/32; 101/3.1; 101/27; 101/31; 264/1.31; 264/319; 264/402
(58) Field of Classification Search ............ None
See application file for complete search history.

(56) References Cited

U.S. PATENT DOCUMENTS

| | | | |
|---|---|---|---|
| 3,758,649 A | * | 9/1973 | Frattarola .............. 264/1.33 |
| 4,223,050 A | | 9/1980 | Nyfeler et al. |
| 4,547,141 A | * | 10/1985 | Ruschmann ............ 425/374 |
| 4,913,858 A | | 4/1990 | Miekka et al. |
| 5,109,767 A | | 5/1992 | Nyfeler et al. |
| 5,115,737 A | * | 5/1992 | Amendola ............. 101/32 |

(Continued)

FOREIGN PATENT DOCUMENTS

CH        594 495        1/1978

(Continued)

*Primary Examiner*—Jill E. Culler
(74) *Attorney, Agent, or Firm*—Hoffmann & Baron, LLP

(57) ABSTRACT

The invention concerns an apparatus and a process for producing a marking on a substrate. Substrates marked in that way are applied to documents such as for example credit cards, personal identity cards or banknotes as security features for affording protection from forgery. Embodiments of these security features have diffractive or holographic structures. Production of the markings is produced by shaping from a mold. A change in the configuration of the marking is possible by changing the mold, which is time-consuming. The new apparatus and the new process are intended to permit the production of individualised markings on a substrate at a low level of apparatus expenditure. The new apparatus has a replication apparatus, in the form of a replication roller, having a replication surface, a device for producing a radiation and a counterpressure apparatus with a counterpressure surface, wherein a substrate is arranged between the replication surface of the replication apparatus and the counterpressure surface of the counterpressure apparatus in such a way that a shaping region of the replication surface is shaped on to the substrate in a contact region between the replication surface and the substrate.

30 Claims, 7 Drawing Sheets

U.S. PATENT DOCUMENTS 5,744,219 A * 4/1998 Tahara ..................... 428/32.79
5,771,796 A * 6/1998 Morrison et al. ............. 101/22
6,652,273 B2 * 11/2003 Butsch et al. ............... 432/229
2003/0131740 A1 * 7/2003 Butsch et al. ................. 101/32

FOREIGN PATENT DOCUMENTS

| DE | 25 55 214 A1 | 6/1977 |
| DE | 102 36 597 A1 | 2/2004 |
| EP | 0 169 326 A1 | 1/1986 |
| EP | 0 419 773 B1 | 4/1991 |
| EP | 0 677 400 A1 | 10/1995 |
| WO | WO 00/30854 | 6/2000 |

* cited by examiner

LASER-SUPPORTED REPRODUCTION METHOD

CROSS-REFERENCE TO RELATED APPLICATIONS

This application is a National Phase application of International Application No. PCT/DE2003/002670 filed Aug. 8, 2003, which claims priority based on German Patent Application No. 102 36 597.0, filed Aug. 9, 2002, and German Patent Application No. 102 50 476.8, filed Oct. 30, 2002, all of which are incorporated herein by reference.

BACKGROUND OF THE INVENTION

The invention concerns a process for producing a marking, for example digits, letters, surface patterns, surface images or decoration, on a substrate, preferably a film, in particular a transfer film, wherein energy in the form of radiation, preferably laser radiation, is introduced from a controllable energy source into a replication surface of a replication apparatus to produce at least one shaping region and wherein the shaping region of the replication surface is shaped on to the substrate by the replication apparatus contacting the substrate under pressure, and an apparatus for producing a marking, for example digits, letters, surface patterns, surface images or decoration on a substrate, preferably a film, in particular a transfer film, comprising a replication apparatus which has a replication surface, a device for producing a radiation, preferably a laser installation, wherein the radiation is directed on to at least one portion of the replication surface to produce at least one shaping region, and a counterpressure apparatus which has a counterpressure surface, wherein the substrate is arranged between the replication surface of the replication apparatus and the counterpressure surface of the counterpressure apparatus in order to shape the shaping region on to the substrate in a contact region between the replication surface and the substrate.

The protection of documents by security features has in the meantime become a standard in the case for example of credit cards, personal identity cards or banknotes. The forgery-proof nature of those features is based on the fact that a high level of special knowledge and extensive apparatus equipment is necessary for the production thereof. A particularly successful security feature which is difficult to copy is an optical variable device. Embodiments of that security feature have diffractive or holographic structures which, upon a change in the angle of incidence of light or the viewing angle, during visual checking of the authenticity of the security feature, lead to an optical effect such as for example a color change, a motif change or a combination of the two. The security feature can thus be checked for its authenticity without further technical aids. An essential component part of those security elements is a generally thermoplastic or UV-hardenable layer into which the diffractive or holographic structure is embossed in the form of a surface relief. That layer can be part of a transfer film, in which case the security element is produced first and thereafter transferred on to the document to be safeguarded. That layer can also be provided in the form of an additional layer directly on the article to be safeguarded. Rotating stamping cylinders as are described for example in EP 0 419 773 or stamping punches as are disclosed for example in DE 25 55 214 are used for transferring the surface relief from a mold on to the thermoplastic layer. Production of the mold is technically very demanding and also cost-intensive by virtue of the fine diffractive or holographic structures. To manufacture the molds firstly patterns, also referred to as masters, are produced for example by interfering laser beams and etching processes or by electron beam writing, which are then generally galvanically shaped.

In the case of the known processes, for enhanced forgery-proof nature, the endeavour is that the same security feature is not applied to each document, but the security features are adapted to the respective document or to the identity of the owner of the document, that is to say individualised. In that respect two difficulties arise in the above-mentioned processes:

On the one hand a large number of individualised masters would have to be produced, which is highly cost-intensive, while secondly the molds have to be respectively interchanged in the replication apparatuses, which would result in very long equipment setting times. As alternatives, processes and apparatuses are known, which shape only partial regions of a mold in order to produce individualised security features.

CH 594 495 describes a process for stamping a relief pattern into a thermoplastic information carrier, wherein selectively only partial regions of the mold are shaped into the thermoplastic layer. In terms of process engineering, those shaping regions are selected by either those regions being heated by heating bands through which current flows, or by only the selected shaping regions being pressed on to the substrate by a counterpressure device which has partial regions which are adjustable in respect of height. A high level of local resolution in regard to selection of the shaping regions is not to be expected with that process as heat conduction during the long heating-up and cooling-down phase for the heating bands means that the boundaries of the shaping regions can be only inaccurately defined or the dimensions of the shaping regions are established by the dimensions of the bands or the dimensions of the partial regions which are adjustable in respect of height. That process is consequently limited by virtue of the fact that it involves a low level of local resolution.

EP 0 169 326 describes an apparatus for producing a marking on a substrate and the process corresponding thereto. The apparatus has a replication apparatus in the form of an unheated stamping mold and a pressure plate in the form of a counterpressure apparatus. The stamping mold has a replication surface which is structured with microstructures to be shaped. The apparatus has a laser arrangement for producing a laser beam which is directed on to the substrate through the counterpressure apparatus. The known process provides that firstly the substrate is pressed on to the pressure plate by the stamping punch. Due to absorption of the laser beam which is incident on the substrate directly in the stamping region, the substrate is selectively locally heated and raised to a temperature at which it can be durably permanently deformed. Positioning of the laser beam makes it possible in that way to selectively select and transfer shaping regions. A limitation with this process and apparatus is that the replication apparatus is in the form of a stamping punch. This means that the process is limited to a cyclic mode of processing, which is contrary to the attainment of a high level of productivity.

SUMMARY OF THE INVENTION

The object of the present invention is to provide a process and an apparatus which permit the production of preferably individualised markings on a substrate, preferably a film, involving a low level of apparatus expenditure.

That object is attained by the process as set forth in claim 1 and the apparatus as set forth in claim 11.

The process according to the invention provides that a marking is produced on a substrate, preferably a film, in particular a transfer film, wherein the replication surface is subjected to a temperature control effect at least in a partial region, using an additional controllable energy source, wherein an energy input by radiation of the radiation source and an energy input from the additional controllable energy source is introduced into the replication surface so that at least a portion of the replication surface is in the form of a heat combination region so that the shaping region is shaped on to the substrate, wherein the portion of the replication surface in the form of the heat combination region or a portion of the replication surface which is complementary to the heat combination region forms the shaping region.

The process according to the invention provides that firstly the replication apparatus is heated with an additional energy source so that regions or at least partial regions of the structured replication surface of the mold are at a first temperature.

The replication surface of the replication apparatus is then exposed using radiation so that a part of the radiation is absorbed by the replication surface and energy input into the replication surface takes place.

The co-operation of the effect of heating the replication apparatus by the additional energy source and selective heating by the radiation gives rise on the replication surface to regions at different temperatures, in particular at least two regions which are set to different temperatures. A part of the regions is preferably at the first temperature while another part of the regions is preferably at a second temperature which is achieved by the additional energy input by the radiation. The regions at the second temperature, by virtue of the way in which they are produced, can be referred to as heat combination regions.

The procedure can be carried out in such a way that either the first temperature or the second temperature corresponds to the working temperature of the shaping operation so that, in a shaping operation, either the partial regions at the first temperature or the partial regions at the second temperature are durably permanently shaped on to the substrate.

The individualised marking preferably comprises the shapings of the partial regions of the replication surface, which were selected by the above-described temperature control effect for a shaping procedure. Individualisation of the marking, that is to say the change in the choice of the shaped regions, can thus be effected by a change in the temperature distribution on the replication surface. Such a change can be carried out by way of the control of the radiation-producing device, for example the laser installation, or the corresponding beam guidance and beam shaping devices.

In a preferred development of the process the first temperature is in a plastic temperature range $T_{plast}$ for the respective substrate and the second temperature is in a flow temperature range $T_{fliess}$ for the respective substrate, the flow temperature range being above the plastic temperature range. The first temperature is preferably at least 100° C., in particular at least 170° C. The plastic temperature is the substrate-specific temperature at which shaping results in a durably permanent marking in the substrate. The plastic temperature range preferably extends between +/−2% of that substrate-specific temperature. A typical temperature range of that kind would be for example 180° C.+/−3.6° C. If the replication apparatus is contacted under pressure with the substrate while a partial region involves a temperature which is in the plastic temperature range, the structured replication surface is durably permanently shaped from that partial region on to the substrate. If the temperature is within a flow temperature range, then, after the mold is separated from the substrate, the deformed material of the substrate will begin to flow. As a result the surface structurings which are shaped into the substrate are smoothed so that they are not retained as optically active structures on the substrate. In this implementation of the process the partial regions which have been set in temperature to a plastic temperature and which have not acquired any additional heat input by the radiation are shaped on to the substrate. Negative selective of partial regions can be implemented by virtue of the radiation.

In accordance with another preferred embodiment of the process the first temperature is in an elastic temperature range $T_{elast}$ for the respective substrate and the second temperature is in a plastic temperature range $T_{plast}$ for the respective substrate, the elastic temperature range being below the plastic temperature range. Preferably the second temperature is at least 100° C., in particular at least 170° C. If the replication apparatus is contacted under pressure with the substrate while a partial region is at a temperature which is in the plastic temperature range, the structured replication surface is durably permanently shaped from that partial region on to the substrate. The partial regions whose temperatures are in the elastic temperature range cause only elastic deformation of the substrate. After separation of the replication apparatus from the substrate the surface structures produced spring elastically back and the substrate assumes approximately its original surface shape again. Then no optically active structures remain on the substrate. In this embodiment of the process therefore the heat combination regions are selectively transferred. The additional heat input by the radiation therefore represents a positive selection of partial regions.

The substrate can be made up of a plurality of layers. The specified temperatures or the specified temperature ranges of the substrate involve in particular temperatures or temperature ranges of a thermoplastic layer which is a constituent part of the substrate. Further layers of the substrate, for example the carrier layer of the substrate, can be at a different temperature.

In an advantageous development of the invention, the replication apparatus is in the form of a replication roller, in which case introduction of the radiation into the replication roller takes place at a first angular position of the replication roller and contact of the replication roller with the substrate takes place at a second angular position. The intermediate angle between the first and second angular positions in the direction of rotation of the replication roller is so small that the heat combination region produced by the radiation in the first angular position, after rotation of the replication roller into the second angular position, still has sharp contours. That is afforded for example if the blur of the latent heat image, which occurs due to heat conduction, is less than the reciprocal, desired resolution of the replication process. The definition of the blur circle from geometrical optics can be used as a measurement in respect of the blur or lack of sharpness. In the limit case that intermediate angle can be in the region of 0° so that the two angular positions are arranged in overlapping relationship.

In addition the object of the invention is attained by an apparatus as set forth in claim 11, wherein the replication surface of the replication apparatus is provided on an outside of a replication roller.

The apparatus according to the invention serves for applying or producing a marking on a substrate. The marking has a surface structuring which preferably acts diffractively or holographically or a matt structure which preferably scatters diffusively or directedly and which is introduced by means of replication processes into a thermoplastic layer of a substrate, in particular a body. The substrate can have further layers with various layer materials and a carrier layer. The marking can be in the form of a figure, digit, character, surface pattern, surface image, text, numbering, security feature or in any other form.

The marking can be introduced into the substrate by means of a replication apparatus having a replication surface which has surface structurings. The replication apparatus can be in the form of a replication roller of an at least portion-wise cylindrical shape and rotatable about its coaxially extending axis of rotation. The cylinder surface, in particular the cylinder casing, can be in the form of a replication surface.

The substrate is arranged between the replication roller and a counterpressure apparatus, providing a contact region.

The counterpressure apparatus which for example can be in the form of a counterpressure plate or a counterpressure roller has a counterpressure surface on which the substrate is supported at least in the contact region so that, in the contact region, the replication roller can co-operate with the substrate under pressure.

With the apparatus according to the invention, partial regions of a stamping mold can be selected for the shaping operation targetedly by the radiation and thus the markings formed from the shapings of the partial regions are of an individualised configuration. It is particularly advantageous in that respect that the individualised identification in the form of the selection of the regions together with a security feature, more specifically for example the diffractive regions, are transferred by a common replication operation. In addition the apparatus according to the invention, by virtue of the continuous, non-cyclic mode of operation, permits economical production.

An advantageous development of the apparatus provides that the radiation is fed through the counterpressure apparatus. In that situation the radiation is transmitted by the counterpressure apparatus or parts of the counterpressure apparatus before the radiation impinges on the replication surface to produce the shaping regions.

In this development of the invention the counterpressure apparatus can also be transparent. The counterpressure apparatus or parts thereof, in particular the portions associated with the counterpressure surface, can have openings and/or inserts which are transparent in respect of the radiation and/or can comprise a material which is transparent in respect of the radiation.

In modified embodiments the counterpressure apparatus is in the form of a counterpressure roller. In that case the counterpressure roller is preferably cylindrical, the cylinder surface being in the form of the counterpressure surface. In particular the counterpressure roller is mounted rotatably about its coaxially extending axis of rotation.

If the counterpressure apparatus is in the form of a counterpressure roller, the feed for the radiation can be effected for example in the various ways set out hereinafter:

In a first fashion, the radiation can be arranged to extend outside the counterpressure roller and can pass through the substrate with a direction of beam propagation which is oriented preferably at an angle with respect to the rear side and/or the front side of the substrate and can subsequently impinge on the replication surface.

In a second fashion the radiation can pass through the counterpressure roller along the entire radial extent thereof, in which case the radiation enters through the counterpressure surface in a region of the counterpressure roller remote from the contact region and issues therefrom again through the counterpressure surface in the contact region. In the further course thereof the radiation can pass through the substrate with a direction of beam propagation which is preferably oriented at a right angle with respect to the rear side and/or the front side of the substrate and can impinge on the replication roller preferably in the contact region.

In a third fashion, if the counterpressure roller is in the form of a hollow body, preferably a hollow cylinder, the radiation can also pass from the hollow space in the hollow body through a wall of the hollow body, in particular through the cylinder wall, so that the radiation preferably issues through the counterpressure pressure in the contact region. In the further course thereof the radiation can pass through the substrate with a direction of beam propagation which is preferably oriented at a right angle with respect to the rear side and/or the front side of the substrate and can preferably impinge on the replication roller in the contact region. Particularly for this last embodiment an advantageous development of the apparatus provides that a radiation-producing unit, preferably a laser installation, or parts thereof, or a beam-deflection unit, is provided within the counterpressure apparatus.

In a further advantageous development of the apparatus or the process, the radiation for producing the shaping regions is fed to the replication surface through the substrate. The radiation enters at a rear surface of the substrate and issues again at an oppositely disposed front surface of the substrate and subsequently impinges on the replication surface. The substrate is preferably transparent in respect of the radiation. In modified embodiments the radiation can partially or almost completely absorb the radiation in one or more layers. The direction of propagation of the radiation within the substrate can be oriented perpendicularly with respect to the front side and/or the rear side of the substrate. In modifications, the radiation passes through the substrate inclinedly, in which case the direction of propagation of the radiation within the substrate is oriented in an angular relationship, in particular at an angle of between 60° and 90°, with respect to the front side and/or the rear side of the substrate.

An advantageous development of the invention provides a cooling apparatus for cooling the replication surface, by which in particular a latent heat image which has been introduced can be erased or modified in some way.

The cooling apparatus can be in the form of a blower, in which case an air flow produced by the blower is directed on to and cools the replication surface. A gas flow cooling effect can perform a similar function, in which case a gas flow and preferably an inert gas flow or a nitrogen gas flow impinges on the replication surface and also cools it.

In further configurations the cooling apparatus can be embodied in the form of a cooling roller which is arranged in parallel displaced relationship with respect to the replication roller and contacts same along a line-shaped surface. The thermal contact between the replication roller and the cooling roller provides for dissipation of heat and thus cooling of the replication roller.

When using a replication roller the cooling apparatus is preferably arranged in such a way that it acts on the replication surface in a region which, in the direction of rotation of the replication roller, is between the contact region of the replication apparatus and the substrate, and the point of impingement of the radiation on the replication surface.

In a further embodiment of the apparatus the radiation-producing device is in the form of a laser installation. The laser installation can desirably have a scanner system and/or a mask projection system. For use of a scanner system, the laser beam is shaped in such a way that the diameter of the laser spot upon impinging on the replication apparatus is preferably in a range of between 0.05 mm and 2.0 mm. That laser spot can be guided over the replication apparatus in sequentially writing mode by the scanner system. In that respect the scanner system can be a system with deflection devices, for example deflection mirrors, or a system with flying optics. The position of the laser spot on the replication apparatus can be altered by the user by means of a control, preferably a path control device, so that various geometrical shapes, images, letters and numbers can be flexibly written on the replication apparatus with the laser spot. In other embodiments the replication apparatus can be exposed over an area by a mask projection system. In that case the beam shaping can be such that the image of a mask is produced, for example by a 4f-structure, on the replication apparatus in such a way that the shape of the laser spot corresponds to the shape of the openings in the mask. In that case the mask can be a rigid mask or however a matrix arrangement consisting of elements which controlledly transmit or extinguish the laser beam, which elements can be for example movable mirrors or liquid crystal elements.

An advantageous configuration provides a control device, in particular a freely programmable control device, which controls the selection of the irradiation regions preferably by actuation of the radiation-producing device. In this advantageous development the patterns of the markings are prepared in the form of preferably digital items of information, for example as a data file, which were produced by image processing programs, computer-aided processes or the like. Those items of information are converted by the control device, in particular by actuation of the laser installation, into a time-dependent change in the power density in relation to surface area of the radiation impinging on the replication apparatus. The shaping regions and thus the pattern of the marking are determined by the controlled selection of the irradiation regions.

The control of power, beam direction and/or power density in relation to surface area of the laser beam permits a plurality of modes of operation of the laser beam.

In a first operating mode the laser beam is switched on and off in control sequences so that markings which are displaced from each other are produced on the substrate. The configuration of those various markings can be respectively the same or can differ from one marking to another by virtue of individualised features, for example by serial numbering.

In a second mode of operation of the laser beam the laser beam is continuously switched on and the point of impingement of the laser beam is moved on the replication roller. The movement of the impingement point is effected in the same direction as or in the opposite direction to the replication roller and parallel to the axial extent of the replication roller. The movement is produced by parallel displacement of the laser beam relative to itself or by angular deflection of the laser beam. In this operating mode a marking can be formed with a pattern which varies in the direction of advance of the substrate. In particular this operating mode permits control sequences of movements of the laser beam for the production of an individual marking to be effected over a plurality of revolutions of the replication roller, that is to say over a plurality of working cycles. By way of example it is possible in that way to produce text of any length in the direction of advance movement on the substrate. In a modification of this operating mode the laser beam is continuously switched on and a time-dependent change in the beam profile of the laser beam is effected.

A combination of the above-mentioned operating modes is also possible.

A desirable development of the apparatus provides that the replication surface is structured with a surface relief. That surface relief is the negative for the structures which are transferred on to the substrate in the shaping operation. The replication surface can be partially or completely structured. The depth of the surface relief is preferably between about 0 and 20 µm, in particular between 0.1 and 0.5 µm. The surface relief, in particular to form a diffractive or holographic structure on the substrate, can be provided in partial regions or over the full surface area involved, in a grating configuration. The grating spacing, that is to say the spatial frequency, is preferably between 4000 lines per mm and 10 lines per mm, in particular being 1000 lines per mm. The replication surface can also be subdivided into partial regions whose dimensions are preferably less than 0.3 mm and which differ from each other in terms of spatial frequency, grating orientation, kind of grating or other parameters.

In another advantageous configuration of the invention those partial regions can be arranged in periodically repetitive relationship, in particular alternatingly. Possible embodiments provide that a respective arrangement of various partial regions, that is to say for example an arrangement of between two and six and preferably three partial regions forms a pixel unit. A plurality of pixel units can be arranged to form a surface image. Preferably the three partial regions referred to by way of example, by virtue of their grating structure, represent the three primary colors. That pixel unit or also the partial regions can be arranged on the replication surface in regular or periodically repetitive relationship, for example in grating form or alternatingly.

In addition, in particular to produce a matt structure on the substrate, the surface relief can be provided with surface structures which involve a stochastic or quasi-stochastic distribution. A matt structure on a substrate, as a particular optical effect, produces diffuse scattering of the light incident on the substrate. To produce a matt structure, the surface relief has surface structures, for example grooves, channels, craters, holes and so forth, whose respective shapes and/or orientations can be respectively similar or of any desired nature and which can be of distributed on the replication surface uniformly, stochastically or quasi-stochastically. For example the surface relief can be provided with a structure similarly to a brushed surface.

In a further advantageous configuration the replication apparatus has a pressure mold of metal film, in particular of nickel or a nickel compound. Galvanic shaping of a diffractive structure of a master is facilitated by the use of metal films of nickel or nickel compounds. As alternatives to those materials, it is also possible to use a material which, for the wavelength of the laser radiation used, has a particularly high level of absorption and in particular a higher level of absorption than nickel. An advantage with that configuration is that the radiated energy required, for producing the latent heat image on the replication apparatus, preferably on the replication surface, is markedly reduced. Accordingly it would be possible to use lasers which are of lower power and thus less expensive in the apparatus.

A particular advantage of the apparatus and the process is that different markings, which for example are also document-specific or person-specific, can be shaped on to a substrate from a single mold, wherein partial regions of that mold can be selectively activated or de-activated for the shaping operation.

BRIEF DESCRIPTION OF THE DRAWINGS

Embodiments by way of example of the process and embodiments by way of example of the apparatus for producing a marking are described hereinafter with reference to drawings in which.

DETAILED DESCRIPTION OF THE INVENTION

Figure 1A:
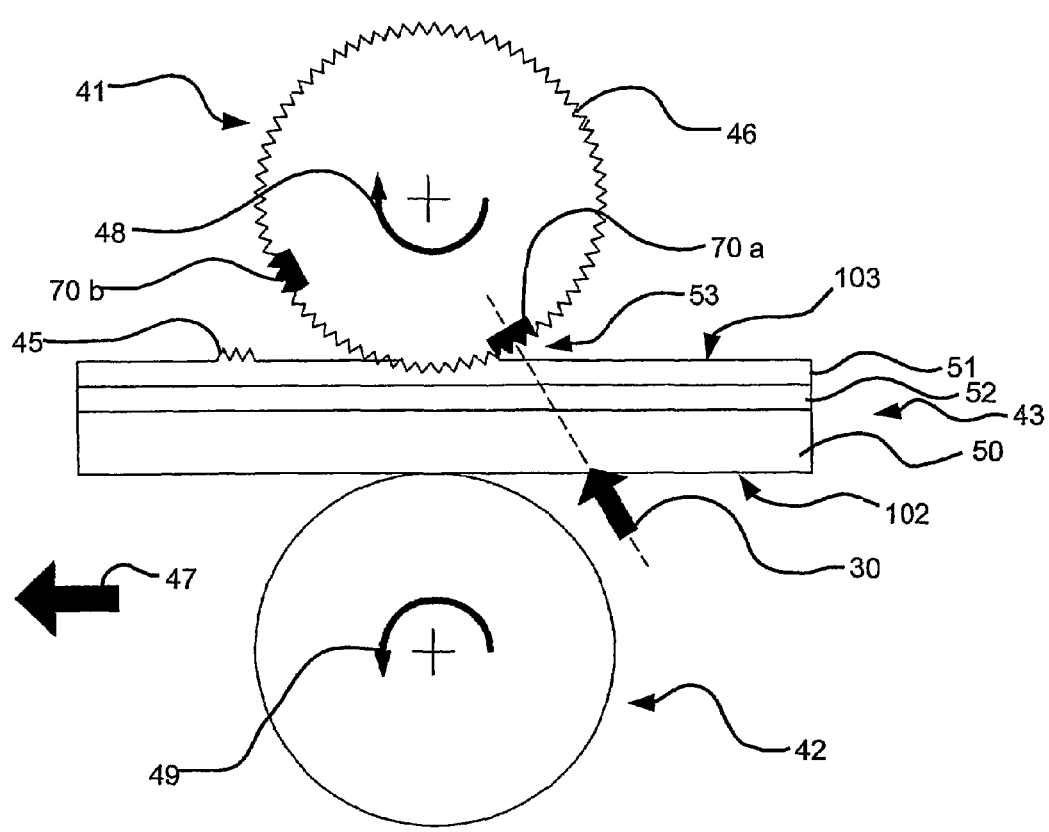
FIG. 1a shows a sectional view of a first embodiment of an apparatus for applying a marking to a substrate.

FIG. 1a is a diagrammatic view in section showing the structure of an embodiment of an apparatus for producing a marking on a substrate 43. The apparatus has a replication roller 41 and a counterpressure apparatus 42 which is in the form of a counterpressure roller and which is arranged with its axis parallel to the replication roller 41 and displaced perpendicularly downwardly. The film-like substrate 43 is provided in a horizontal orientation between the replication roller 41 and the counterpressure apparatus 42. A laser beam 30 passes through the substrate 43 and impinges on the replication roller 41. The orientation of the path of the laser beam is described in greater detail hereinafter.

The metallic or metallically encased replication roller 41 is in the form of a cylinder, wherein the corresponding cylinder casing is in the form of a replication surface with surface structurings in the form of diffraction stamping structures 46. The diffraction stamping structures 46 are of a depth of preferably between nearly 0 µm and 20 µm and involve line spacings or spatial frequencies of between 10 lines per millimeter and 4000 lines per millimeter. The replication roller 41 is heated by a controllable inner, that is to say internally acting, heat source (not shown) so that the entire region of the replication surface which has the diffraction stamping structures 46 can be subjected to a temperature control effect.

The counterpressure apparatus 42 is in the form of a roller in the shape of a cylinder and comprises rubber or has a casing portion comprising rubber. The corresponding cylinder casing forms a counterpressure surface co-operating with the replication surface of the replication roller 41.

The film-like substrate 43 has a front surface 103 which in FIG. 1a faces upwardly towards the replication roller 41 and a rear surface 102 which in FIG. 1a faces downwardly towards the counterpressure apparatus 42, and is in the form of a multi-layer composite of a thickness of less than 1 mm. The multi-layer composite includes a thermoplastic layer 51, a carrier film 50 and optionally one or more, in particular different layers 52 such as for example metallisation layers, interference layers, protective lacquer layers, release layers, carrier material layers or adhesive layers.

An arrow 48 and an arrow 49 show the respective directions of rotation of the replication roller 41 and the counterpressure apparatus 42, with the replication roller 41 rotating in the clockwise direction in FIG. 1a and the counterpressure apparatus 42 rotating in the counter-clockwise direction. An arrow 47 points in the direction of advance of the substrate 43 which moves towards the left in FIG. 1a. The replication roller 41, the substrate 43 and the counterpressure apparatus 42 co-operate in such a way that the replication surface with the diffraction stamping structures 46 is pressed under a given adjustable pressure against the substrate 43 during the rotation of the replication roller 41 and the counterpressure apparatus 42. The contact region between the replication roller 41, the counterpressure apparatus 42 and the substrate 43 forms the replication gap 53.

In FIG. 1a the laser beam 30 is shown as an arrow arriving inclinedly from bottom right. The illustrated path of the laser beam 30 begins in a region which is arranged beneath the substrate 43, that is to say on the side of the rear surface 102 of the substrate, and on the substrate-entry side of the apparatus. The laser beam 30 is directed on to the replication roller 31, the laser beam 30 being arranged outside the counterpressure apparatus 42 over the entire path of the beam. The laser beam 30 passes through the rear surface 102 into the substrate 43 at an entry angle of less than 30°. The point of entry of the laser beam 30 into the substrate 43 is arranged upstream of the replication gap 53 in the direction of advance of the substrate 43. The entry angle is measured in relation to the surface normal of the substrate 43 at the entry point. The laser beam 30 passes through the substrate 43, issues through the front surface 103 of the substrate 43 and impinges on the replication surface. Surface portions are identified on the replication surface as replication surface portions 70a, b. This involves the region of the replication surface, which is treated with the laser beam.

In the position of the apparatus shown in FIG. 1a a first replication surface portion 70a, in the direction of rotation of the replication roller 41, is in a position prior to entry into the replication gap 53, more specifically in a position in which the replication surface portion 70a is just being irradiated by the laser beam 30 issuing from the substrate 43.

During operation of the apparatus the replication roller 41 rotates continuously in the clockwise direction and the replication surface portion 70a is passed through the replication gap 53 in the further movement after the irradiation step. In the replication gap 53, the irradiated replication surface portion 70a is shaped into the substrate 43 as a marking.

In the position of the apparatus shown in FIG. 1a, the second replication surface portion 70b, as viewed in the direction of rotation of the replication roller 41, is in a region downstream of the replication gap 53. That replication surface portion 70b has already passed through the phases of irradiation upstream of the replication gap 53 and shaping in the replication gap 53. The shaped marking 45 corresponding to the replication surface portion 70 is accordingly disposed in a region of the substrate 43, which is arranged downstream of the replication gap 53 in the direction of advance of the substrate 43.

In the embodiment of the process shown in FIG. 1a the replication surface is raised by an inner controllable heat source to a temperature which is within the elastic temperature range $T_{elast}$.

The replication surface portions 70a, b are further heated by the additional energy inputs by means of the laser beam 30 in the irradiation procedure. Due to the combination of the energy input by virtue of heating with the inner heat source and the additional energy input by the irradiation procedure involving the laser beam 30, heat combination regions are formed in the region of the replication surface portions 70a, b. Those heat combination regions represent latent heat images which can be a simple geometrical shape such as for example a circle, a multi-angled shape, a closed polygon, but can also be in the form of a letter, a digit or a symbol.

In the example of FIG. 1a the energy inputs are such that the heat combination regions, that is to say the replication surface portions 70a, b, are at a temperature within the plastic temperature range $T_{plast}$ upon making contact with the substrate 43 in the replication gap 53. Those regions are durably permanently shaped into the substrate 43.

The remaining regions on the replication surface are at temperatures below the plastic temperature range $T_{plast}$, upon making contact with the substrate 43 in the replication gap 53, that is to say they are in the elastic temperature range $T_{elast}$. Those regions are not durably permanently shaped into the substrate 43.

After the shaping operation in the replication gap 53 it can be desirable for the currently prevailing latent heat image to be extinguished and for the replication surface to be put into a condition in which a fresh latent heat image can be produced there.

For extinguishing the currently prevailing latent heat image, a cooling region is provided downstream of the replication gap 53 in the direction of rotation of the replication roller 41. The replication surface passes through that cooling region and co-operates with a cooling apparatus (not shown in FIG. 1a). The replication surface is thereby cooled down to a temperature below the temperature range $T_{plast}$.

Then the temperature of the replication surface is again controlled to a temperature within the temperature range $T_{elast}$.

Therefore, the latent heat image is extinguished by a controlled change in the temperature of the replication surface.

Alternatively or additionally the latent heat image is extinguished spontaneously by heat conduction in the sense of causing the latent heat image to fade away.

The principle of the process for producing a marking 45 on the substrate 43, as is used in FIG. 1a, will be illustrated once again with reference to FIG. 1b.

Figure 1B:
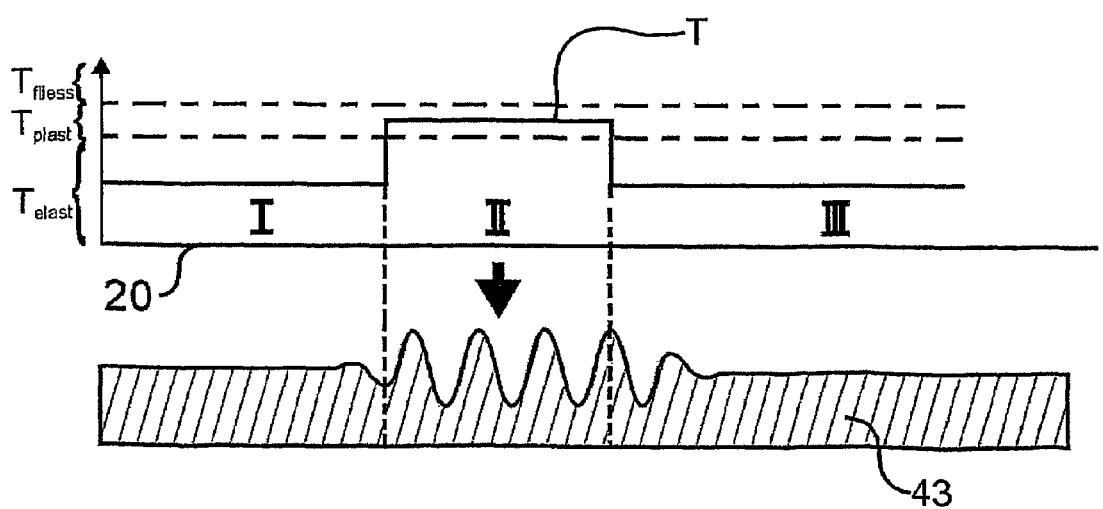
FIG. 1b shows the temperature profile on the replication surface of the replication apparatus in FIG. 1a in a co-ordinate system and a marking corresponding to the temperature profile in the substrate as a sectional view.

FIG. 1b shows a co-ordinate system 20 which illustrates the temperature of the replication surface as it passes through the replication gap 53, in the form of a temperature profile T. FIG. 1b also shows as a sectional view on an enlarged scale the region of the substrate 43 of FIG. 1a, which carries the marking 45 corresponding to the temperature profile T.

The temperatures of the replication surface during the shaping operation in the replication gap 53 are plotted on the vertical Y-axis in the co-ordinate system 20. The corresponding positions on the replication surface along the periphery of the replication roller 41 are plotted on the horizontal X-axis of the co-ordinate system 20.

The temperature scale on the Y-axis is qualitatively subdivided into three ranges: the first range is the elastic temperature range $T_{elast}$. The temperature range thereabove, involving higher temperatures, is the plastic temperature range $T_{plast}$. The highest temperature range which is shown above that is the flow temperature range $T_{fliess}$.

To illustrate the effects of temperature at the replication surface during the shaping operation on the result of the shaping operation, illustrated below the co-ordinate system is the portion of the substrate 43, which corresponds to the temperature profile T. The substrate 43 is oriented in its longitudinal extent in parallel relationship with the X-axis of the co-ordinate system 20.

The temperature profile of the replication surface, which is illustrated along the X-axis, is subdivided into three regions I, II and III.

In the regions I and III, the replication surface, on passing through the replication gap 53, involves temperatures within the elastic temperature range $T_{elast}$. In the region II, on passing through the replication gap 53, the temperature is within the plastic temperature range $T_{plast}$.

Upon contact of the replication surface with the substrate 43, in the region I the structures are produced in the substrate 43 in the form of elastic deformations. After separation of the replication surface and the substrate 43, the substrate 43 in those regions elastically resiliently resumes its original shape and no surface structurings remain in the substrate 43.

In the region II, when contact occurs between the replication surface and the substrate 43, a permanently remaining marking is shaped into the substrate 43. The marking shown in FIG. 1b corresponds to the marking 45 in FIG. 1a.

In the region III, similarly to the region I, when the replication surface is in contact with the substrate 43, no surface structuring is produced in the substrate 43.

The process illustrated in FIGS. 1a and 1b produces a marking 45 on the substrate 43, in respect of which only the replication surface portions 70a, 70b which are irradiated with the laser beam 30, that is to say the heat combination regions, are shaped on to the substrate. A marking 45 formed in that way is also referred to hereinafter as a positive image.

Described hereinafter is a time-dependent side-effect of the process illustrated in FIGS. 1a and b, and the compensation for same:

In FIG. 1a energy input into the replication surface portion 70a is effected by means of laser beam 30 in a region on the rotating replication roller 41 upstream of the replication gap, more specifically at a position which involves a rotary angle spacing of about 20° with respect to the replication gap 53. A time spacing between the irradiation procedure and the shaping procedure results from the spatial spacing between the irradiation position and the shaping position.

The spacing in respect of time results in heat losses (energy losses) in the heat combination regions, for example by virtue of heat conduction. In the extreme case that effect can mean that the heat combination regions in the replication gap 53 are at a temperature below the plastic temperature range $T_{plast}$.

To compensate for the heat losses, the energy input by the laser beam 30 is suitably increased so that, in the heat combination regions, a temperature within the plastic temperature range $T_{plast}$ on passing through the replication gap 53 is guaranteed. The increase can be such that, after the irradiation operation, the heat combination regions are initially at a temperature within the flow temperature range $T_{fliess}$ and, by the time they reach the replication gap 53, they are cooled to a temperature within the plastic temperature range $T_{plast}$.

The above-indicated side-effect can occur not only in connection with the temperature or temperature range $T_{plast}$, but also in a comparable or similar manner in relation to other temperatures or temperature ranges, for example $T_{fliess}$, $T_{elast}$. Compensation can be effected in a similar manner to the above-described procedure.

Figure 2A:
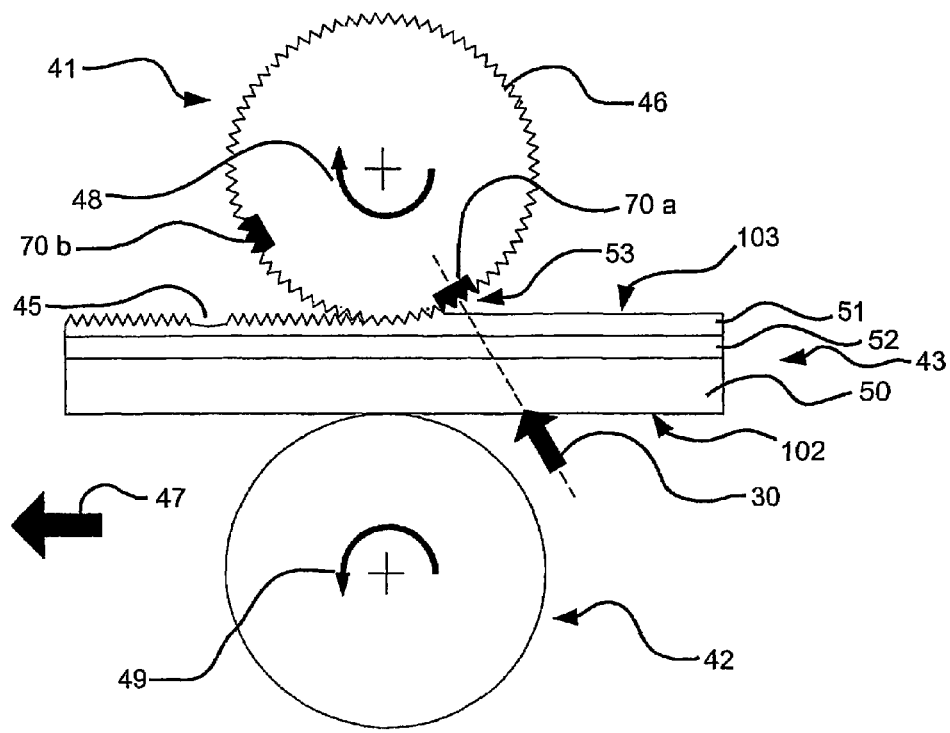
FIG. 2a shows the same view as in FIG. 1a of the first embodiment of the apparatus of FIG. 1a with a modification of the process.

FIG. 2a shows the same embodiment of the apparatus as in FIG. 1a, with a second implementation of the process, the difference between the implementations of the process being in the temperature management.

In the process illustrated in FIG. 2a the replication surface is raised by an inner controllable heat source to a temperature which is within the plastic temperature range $T_{plast}$.

The irradiated replication surface portions 70a, b are further heated by the additional energy input by means of the laser beam 30. The energy inputs are such that, upon making contact with the substrate 43 in the replication gap 53, the replication surface portions 70a, b are at a temperature within the flow temperature range $T_{fliess}$.

Upon making contact with the substrate 43 in the replication gap 53, only the non-irradiated regions are at a temperature in the temperature range $T_{plast}$, while the irradiated regions there are at a temperature within the temperature range $T_{fliess}$.

In this second embodiment of the process, only the regions of the replication surface which are complementary to the replication surface portions 70a, b irradiated with the laser beam 30, that is to say which are complementary to the heat combination regions, are shaped.

The extinction of a latent heat image produced in that way on the replication surface can be effected in a similar manner to the extinction procedure described with reference to FIG. 1a.

Figure 2B:
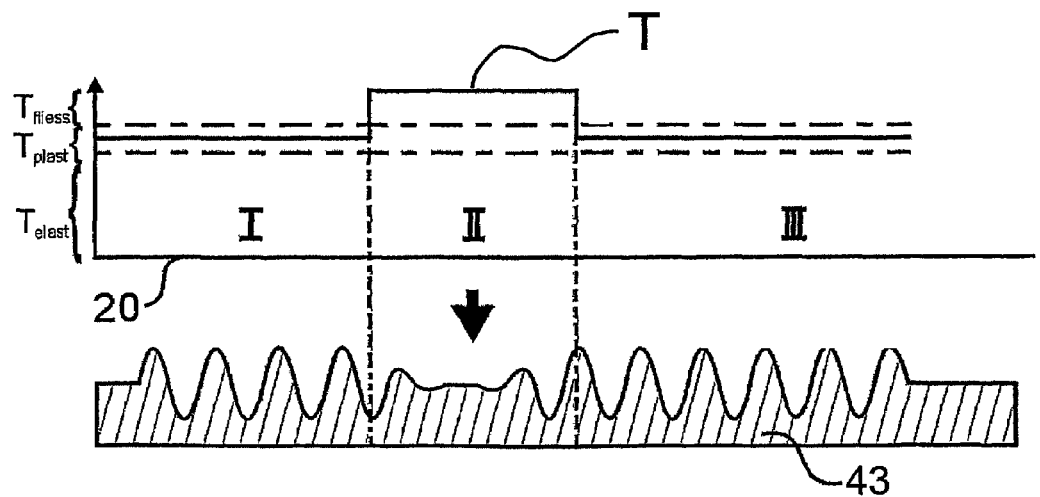
FIG. 2b is a view similar to FIG. 1b showing the temperature profile on the replication surface of the replication apparatus of FIG. 2a and a marking corresponding to the temperature profile, in the substrate.

The principle of carrying out the process as shown in FIG. 2a is again diagrammatically shown in FIG. 2b in the same view as in FIG. 1b, wherein therefore the temperature pattern T is different from that shown in FIG. 1b.

The temperature profile T in FIG. 2b of the replication surface on passing through the replication gap 53 is in the plastic temperature range $T_{plast}$ in the regions I and III, whereas in the region II the temperature is within the flow temperature range $T_{fliess}$.

In the region I, upon contact of the replication surface with the substrate 43, a durably permanent marking is shaped into the substrate 43.

Upon contact of the replication surface with the substrate 43, in the region II, the structures are initially formed in the substrate 43, as plastic deformations. After separation of the replication surface and the substrate 43, the substrate material begins to flow so that the surface structurings produced in the substrate 43 do not durably remain.

In the region III, similarly to the region I, upon contact of the replication surface with the substrate 43, a surface structuring is produced in the substrate 43.

The substrate 43 in FIG. 2b has a surface structuring in regions corresponding to the regions I and III, whereas, in a region corresponding to the region II, the surface profile is so-to-speak healed again, and the surface is almost flat or is of a stochastic structure. At any event the regions II and the regions I and III are visually distinguishable.

The process illustrated in FIGS. 2a and 2b produces a marking 45 on the substrate 43, in which only the regions which have not been irradiated with the laser beam are shaped. Such markings are also referred to hereinafter as a negative image.

Figure 3:
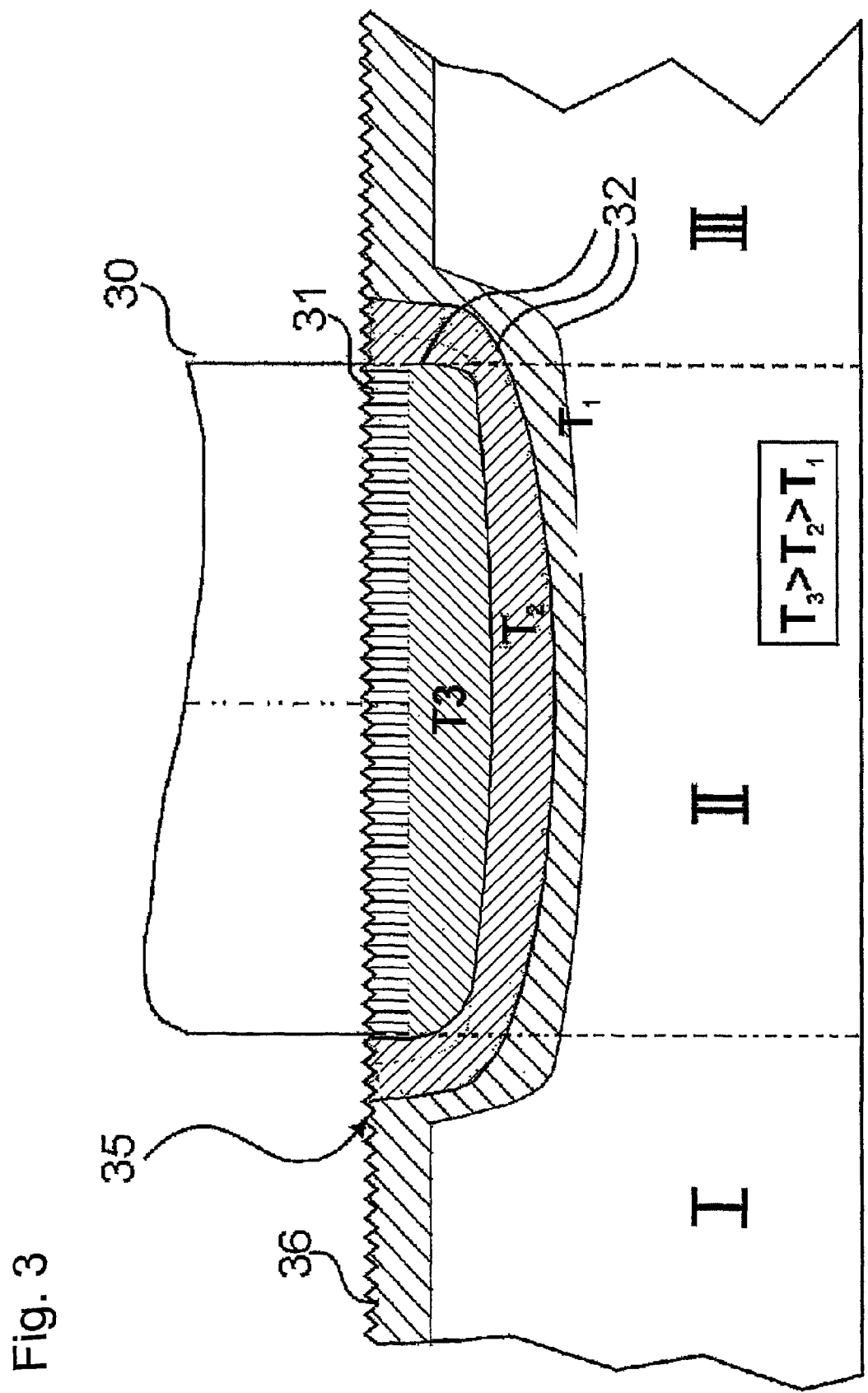
FIG. 3 is a diagrammatic view in section showing the heat distribution in a portion of the replication apparatus in FIG. 1a upon exposure with the laser beam, FIGS. 4a and b show diagrammatic views to illustrate the principle for producing a negative and a positive image respectively, FIGS. 5a, and b each show a diagrammatic plan view of a respective portion of the surface of the replication apparatus of FIG. 1a and a marking produced by the replication apparatus.

FIG. 3 is a sectional view of a replication apparatus 35 corresponding to the replication roller 41 in FIG. 1a. The replication apparatus 35 is provided at its replication surface with surface structurings 36. Isotherms 32 show the heat distribution in the replication apparatus in the region of the surface structuring 36. For simplification purposes, the Figure only shows three isotherms 32 which delimit from each other regions involving different temperatures $T_1$, $T_2$ and $T_3$. The Figure also shows the laser beam 30 which is directed on to the replication surface with the surface structuring 36 and impinges thereon, as well as a diagrammatic indication of the absorption volume 31.

In a first step in the process, in the proximity of the replication surface with the surface structuring 36, the replication apparatus is set to a first temperature $T_1$, in the regions I, II and III shown here.

In the next step in the process which however can also overlap in time with the first step in the process, the replication apparatus 35 is exposed with the laser beam 30 in the region II. In that case the laser beam 30 is absorbed at the replication surface with the surface structuring 36, in an absorption volume 31. The energy input in the absorption volume 31 provides that the absorption volume further increases, from the temperature $T_1$, to a temperature $T_3$. Heat conduction causes the temperature region $T_1$ to be further displaced into the replication apparatus, and this affords a heat distribution as shown in FIG. 3. Depending on the initial temperature $T_1$ and the energy input as well as the position and the extent of the laser beam 30, it is possible to produce a temperature profile as shown in FIG. 1b for a positive image or a temperature profile as shown in FIG. 2b for a negative image on the replication surface.

Figure 4A:
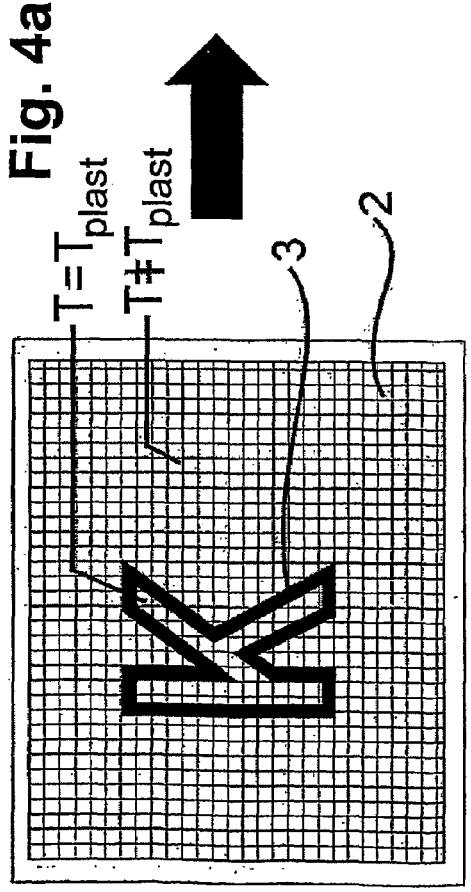
Figure 4A:
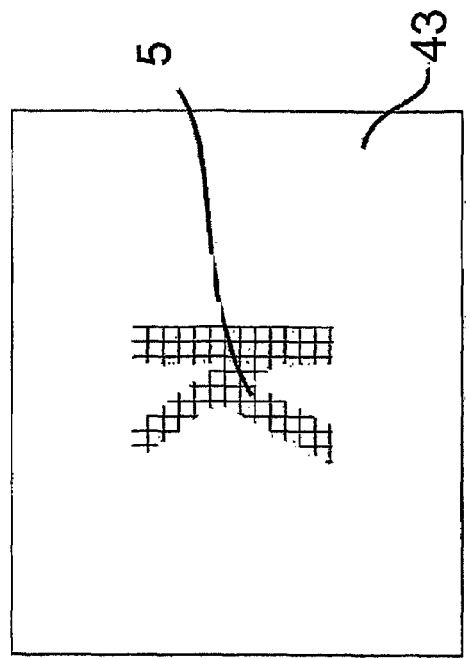

FIGS. 4a and b show the principle of the way in which an individualised security feature can be produced by various embodiments of the process. Shown at the left as a plan view in each case is a partial region of the replication surface such as for example from the replication roller 41 of FIG. 1a, with a structured surface 2. Shown at the right as a plan view is a portion 4 from a substrate after the shaping operation as for example from the substrate 43 in FIG. 1a.

In FIG. 4a the k-shaped surface portion 3 of the surface 2 is at a temperature T which is within the plastic temperature range $T_{plast}$ of the substrate. Outside that region the surface 2 is at a temperature which is outside the plastic temperature range $T_{plast}$. In a shaping operation with that temperature distribution, a positive image 5 is produced on the substrate 43, the mirror-image k-shaped surface portion of the positive image being filled with the impression of the surface structurings of the structured surface 2.

Figure 4B:
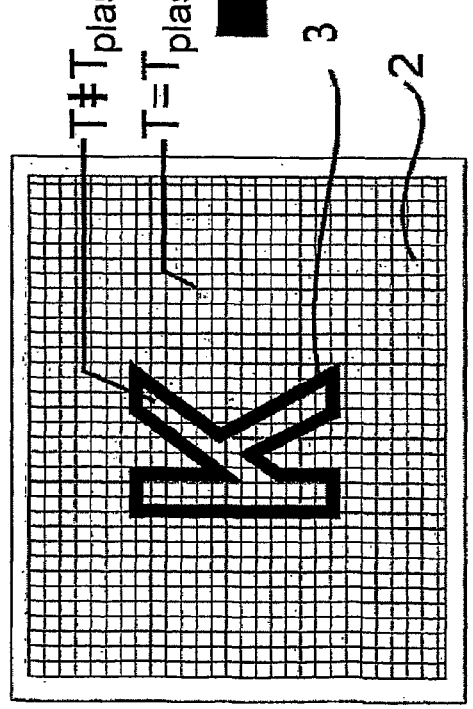
Figure 4B:
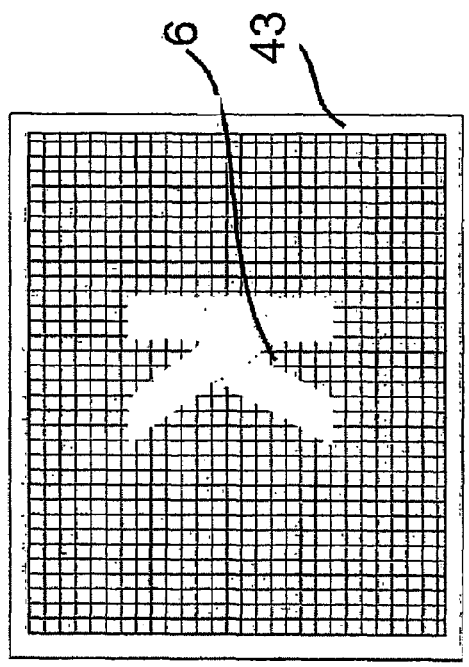

In FIG. 4b the k-shaped surface portion is at a temperature T outside the plastic temperature range $T_{plast}$ and the remaining regions of the surface 2 are at a temperature T within that range. The durably permanent impression on the substrate 43, which results from that temperature distribution in a shaping operation, is a negative image 6, the regions which are complementary to the mirror-image k-shaped surface portion being filled with the impression of the surface structurings of the structured surface 2.

Figure 5A:
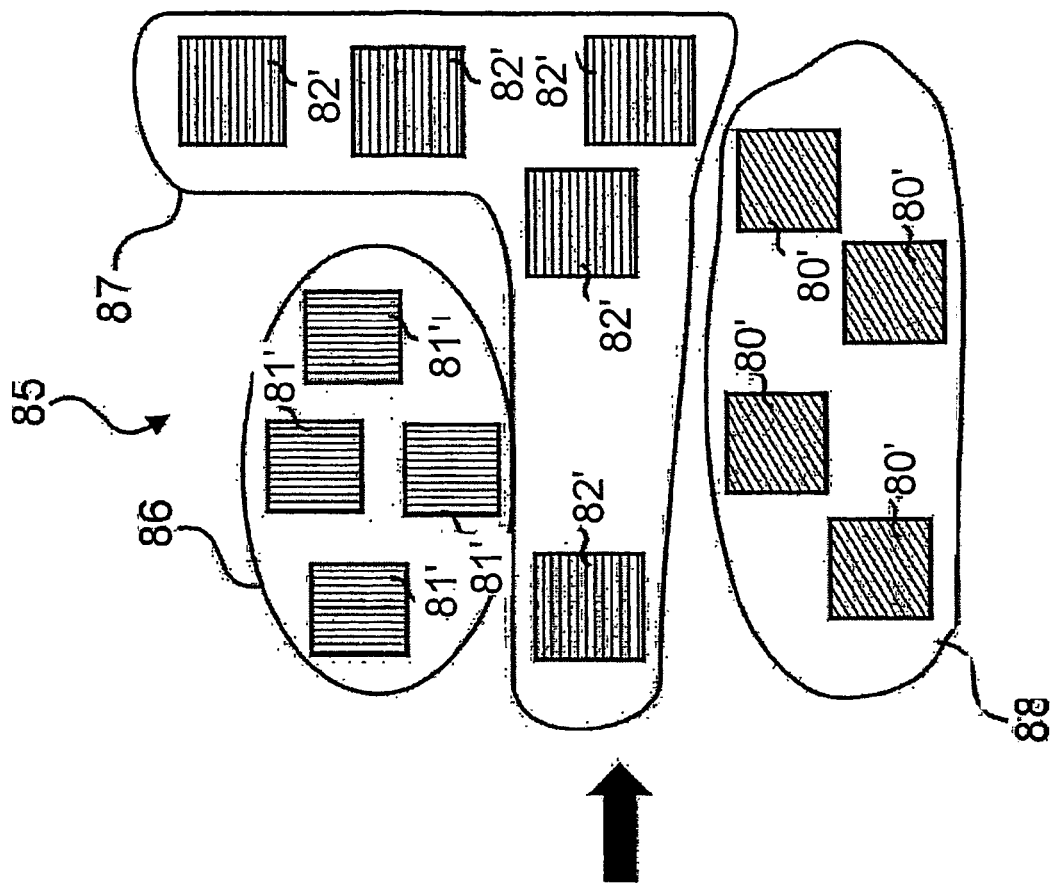
Figure 5A:
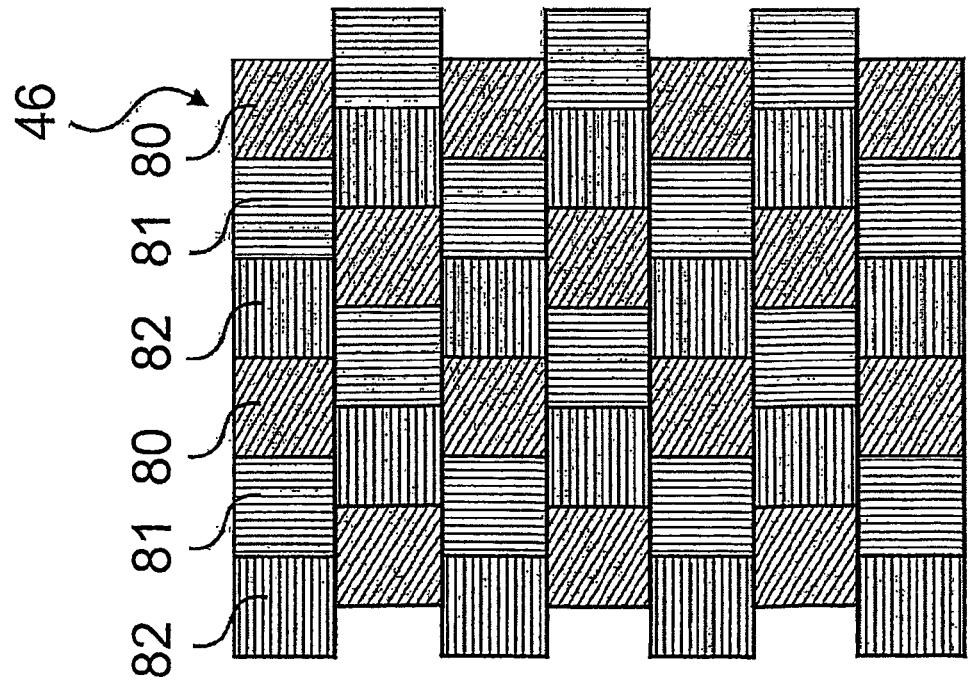
Figure 5:
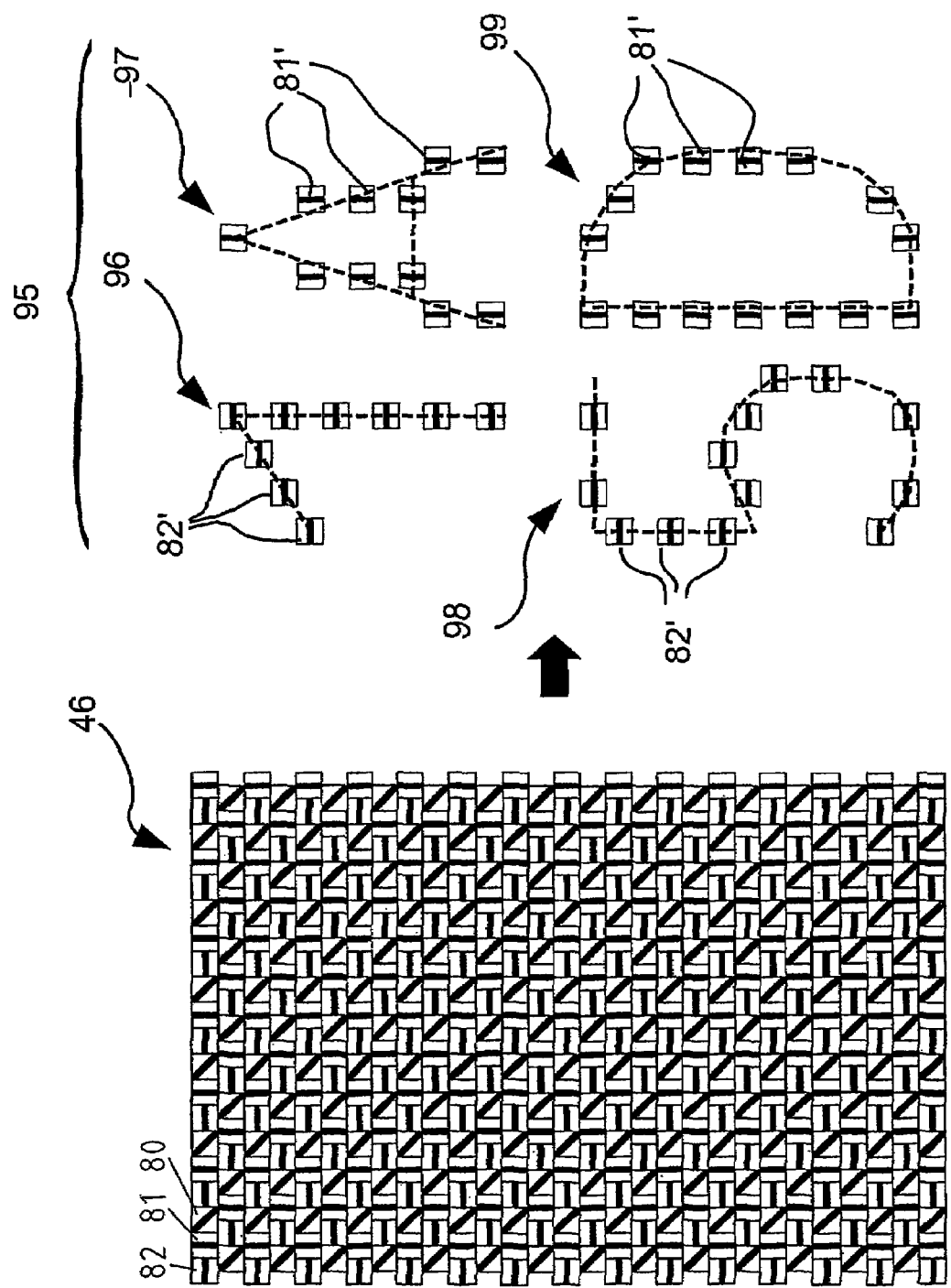

FIG. 5a shows a portion of the replication surface of the replication roller 41 in FIG. 1a with a diffraction stamping structure 46 which is subdivided into various partial regions. Those partial regions are formed from a limited number of diffraction patterns which differ in respect of spatial frequency, relief depth, azimuth, curvature of the grating, the profile shape or other parameters. The view in FIG. 5a shows as representative of the many possible options partial regions with three different diffraction patterns, in particular with a different azimuth, namely 80, 81 and 82. Each partial region 80, 81 and 82 respectively has only one diffraction pattern. Those different partial regions 80, 81, 82 are arranged regularly alternately as pixels. Preferably the partial regions 80, 81, 82 are in the form of delimited surface fields of a square contour, for example with side lengths of less than or equal to 0.3 mm. By means of the process set forth herein, it is now possible, by exposure with radiation, in particular laser radiation, to activate or de-activate partial regions 80, 81, 82 for transfer from the replication roller on to the substrate, in order to produce a positive or a negative image in a replication operation. An image 85 produced in that way has partial region shapings 80', 81', 82' in respect of the partial regions 80, 81, 82.

In this embodiment the partial regions 80, 81, 82 of the diffraction stamping structure 46 were selected by the heat distribution in the replication apparatus in such a way that the image 85 produced has image regions 86, 87, 88 which each have only one kind of diffraction patterns, that is to say they are each respectively formed only from one kind of partial region shapings 80', 81', 82', namely the image region 86 is formed exclusively from partial region shapings 81', the image region 87 exclusively from partial region shapings 82' and the image region 88 exclusively from partial region shapings 80'. When the image 85 is considered, those image regions 86, 87, 88 comprising individual separate partial region shapings appear as full-area, homogenous image regions as are known from conventionally produced images, with the difference that the image regions 86, 87, 88 have particular optical properties, for example holographic properties.

FIG. 5b shows on the left-hand side, as a similar view to FIG. 5a, another portion of the replication surface of the replication roller 41 of FIG. 1a with a diffraction stamping structure 46. The diffraction stamping structure again has different partial regions 80, 81, 82. The right-hand side of FIG. 5b diagrammatically shows a different image 95 which is produced after selection and shaping of the partial regions 80, 81, 82, in accordance with the above-outlined process. The image 95 has image regions 96, 98 and image regions 97, 99. The image regions 96, 98 are each in the form of a digit and more specifically 1 and 5 respectively and are filled with partial region shapings of a single kind, namely the partial region shaping 82'. The image regions 97, 99 in contrast are in the form of letters A and D and comprise a plurality of partial region shapings 81'. The partial region shapings 81' and 82' in FIG. 5b differ by virtue of the arrangement, in particular the azimuthal orientation, of the diffraction gratings, wherein in FIG. 5b the diffraction gratings in the partial region shaping 82' are arranged in a lying position while in the case of the partial region shaping 81' they are arranged in an upright position. The differing arrangement of the diffraction gratings results in an angle-dependent diffraction effect so that, besides their geometrical information, digits or letters, the image regions 96, 98 and 97, 99 additionally also carry holographic information.

In the case of the image 95, only the first characters 96, 98 are visible at a first viewing angle and only the second characters 97, 99 are visible at a second viewing angle.

Figure 6A:
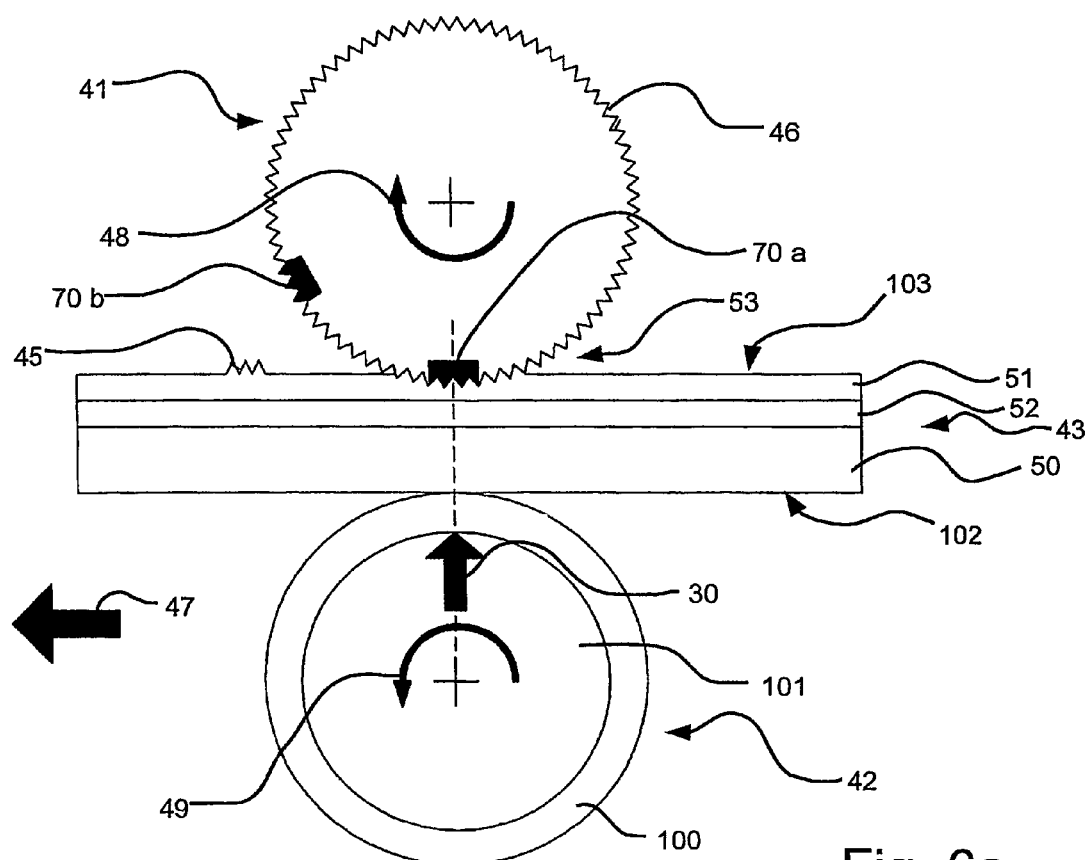
FIG. 6a is the same view as in FIG. 1a showing a second embodiment of an apparatus for applying a marking to a substrate.
Figure 6B:
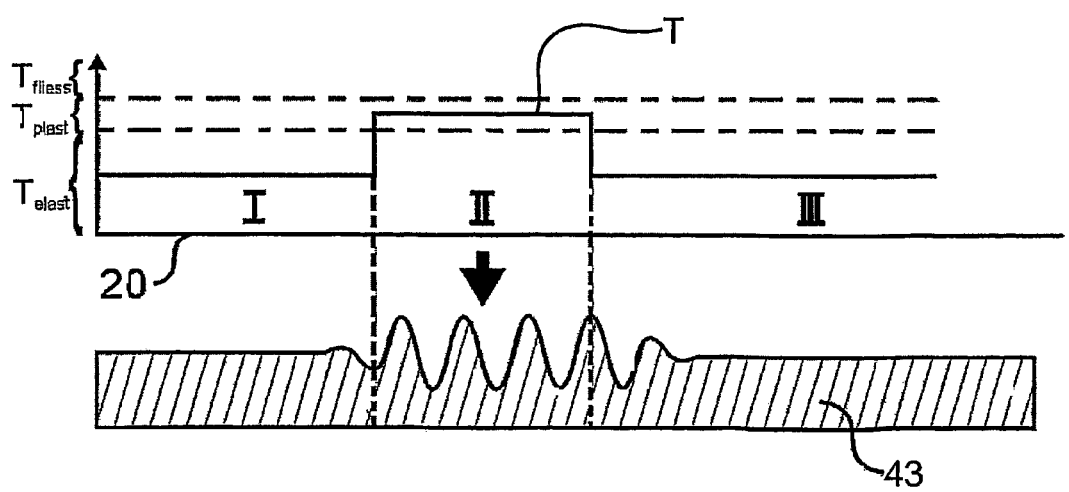
FIG. 6b shows a view similar to FIG. 1b illustrating the temperature profile on the replication surface of the replication apparatus of FIG. 6a and a marking corresponding to the temperature profile, in the substrate.

FIG. 6a shows a second embodiment of an apparatus for producing a marking in the same view as the apparatus of FIG. 1a. Similarly to the apparatus of FIG. 1a, the apparatus shown in FIG. 6a has an arrangement comprising a replication roller 41, a substrate 43 and a counterpressure apparatus 42. In FIG. 6a however the counterpressure apparatus 42 and the arrangement and the path of the laser beam 30 differ from FIG. 1a. The principle of the process, which has already been described with reference to FIG. 1b, is clearly shown in FIG. 6b.

In the embodiment of FIG. 6a, the counterpressure apparatus 42 is in the form of a hollow cylinder with a hollow space 101 and a cylinder wall 100, the outside of the cylinder wall 100 being in the form of a counterpressure surface. The inside surface of the cylinder wall 100 is arranged in concentric relationship with the counterpressure surface. The cylinder wall 100 comprises a material which is transparent for the radiation, for example glass or plastic material.

The laser beam 30, starting from the hollow space 101, is directed on to the replication roller 41. Starting from the hollow space 101, the laser beam 30 penetrates into the cylinder wall 100 through the inside surface thereof, passes through the cylinder wall 100 and issues from the cylinder wall 100 through the counterpressure surface. In its further path, the laser beam 30 passes through the substrate 43. After issuing from the substrate 43 the laser beam 30 irradiates a replication surface portion 70a arranged in the region of the replication gap 53. In this embodiment therefore, a heat combination region is only formed directly in the region of the replication gap 53.

In further embodiments, parts of a laser source or an entire laser source, for example a diode laser, are integrated into the replication roller 41 or the feed of the laser beam 30 into the hollow space 101 is effected for example by way of one or more optical waveguides or by way of open beam guidance extending coaxially with respect to the replication roller 41. In addition beam guide devices or beam shaping devices, for example scanner devices, can be provided in the replication roller 41.

The process for producing a marking and control of the laser beam 30 as well as structural or functional features are similar to the configurations and description relating to the first embodiment of the apparatus in FIG. 1a so that it is also possible to produce positive and negative images with the apparatus of FIG. 6a.

What is claimed is:

1. A process for producing a marking on a substrate,
wherein energy in the form of radiation is introduced from a controllable energy source into surface structurings of a replication surface of a replication apparatus to produce at least one shaping region,
wherein the shaping region of the replication surface is shaped on to the substrate by the replication apparatus contacting the substrate under pressure,
wherein the replication surface is subjected to a temperature control effect at least in a partial region using an additional controllable energy source,
wherein an energy input by radiation from the radiation producing energy source and an energy input from the additional controllable energy source is introduced into the replication surface so that at least one portion of the replication surface is in the form of a heat combination region, wherein at least two portions of the replication surface are set to different temperatures, wherein the marking is formed by shaping the shaping region on the substrate, wherein the portion of the replication surface which is in the form of the heat combination region directly and/or indirectly forms the shaping region, and wherein, for the moment in time of the shaping operation, the temperature of the replication surface is set such that:

the temperature of the replication surface outside the heat combination region is set to a temperature or a temperature range in the plastic temperature range of the substrate and the temperature of the replication surface within the heat combination region is set to a temperature or a temperature range in the flow temperature range of the substrate; or the temperature of the replication surface outside the heat combination region is set to a temperature or a temperature range in the elastic temperature range of the substrate and the temperature of the replication surface within the heat combination region is set to a temperature or a temperature range in the plastic temperature range of the substrate.

2. A process as set forth in claim 1, wherein the radiation introduced to produce the at least one shaping region is fed through the substrate.

3. A process as set forth in claim 1, wherein a rotating replication roller having the replication surface on its outside is used as the replication apparatus and the radiation is introduced into the replication surface of the replication roller before and/or while the heat combination region resulting therefrom comes into contact with the substrate for the shaping operation.

4. A process as set forth in claim 3, wherein a counterpressure apparatus co-operating with the replication roller is used, and the radiation for producing the at least one shaping region is supplied through the counterpressure apparatus or parts of the counterpressure apparatus into the replication surface of the replication roller.

5. A process as set forth in claim 3, wherein introduction of the radiation into the replication surface of the replication roller is effected at a first angular position of the replication roller and the shaping operation by contact of the replication surface of the replication roller with the substrate is effected at a second angular position of the replication roller, wherein, in the direction of rotation of the replication roller, an intermediate angle of less than 30° is set between the first angular position and the second angular position.

6. A process as set forth in claim 3, wherein a control sequence for actuation of the radiation-producing device extends over more than one revolution of the replication roller.

7. A process as set forth in claim 1, wherein the radiation acts over an area and !or in point form sequentially on the replication surface.

8. A process as set forth in claim 1, wherein the position of the impingement point of the radiation on the replication surface is controllable by a one-dimensional or multi-dimensional movement of the radiation and/or the power density in relation to surface area of the radiation at the impingement point of the radiation on the replication surface is controllable.

9. A process as set forth in claim 1, wherein the substrate is a transfer film.

10. A process as set forth in claim 1, wherein the energy introduced into the surface structurings of the replication surface is laser radiation energy.

11. Apparatus for producing a marking on a substrate comprising:

a replication apparatus which is in the form of a replication roller, wherein a replication surface having surface structurings is provided on an outside of the replication roller, a controllable energy source for producing a radiation wherein the radiation for producing at least one shaping region is directed on to at least one portion of the replication surface, and a counterpressure apparatus which has a counterpressure surface, wherein the substrate is arrangeable between the replication surface of the replication apparatus and the counterpressure surface of the counterpressure apparatus in order to shape the shaping region on to the substrate in a contact region between the replication surface and the substrate, wherein there is provided an additional controllable energy source in the form of a heating apparatus for temperature control of the replication surface, wherein at least two portions of the replication surface are settable to different temperatures by an energy input of radiation from the energy source and an energy input from the heating apparatus into the replication surface so that at least one portion of the replication surface is in the form of a heat combination region, wherein the marking is formable by shaping the shaping region on the substrate, wherein the portion of the replication surface which is in the form of the heat combination region directly and/or indirectly forms the shaping region, and wherein, for the moment in time of a shaping operation, the replication surface has an operable temperature range such that:

the temperature of the replication surface outside the heat combination region is set to a temperature or a temperature range in the plastic temperature range of the substrate and the temperature of the replication surface within the heat combination region is set to a temperature or a temperature range in the flow temperature range of the substrate; or the temperature of the replication surface outside the heat combination region is set to a temperature or a temperature range in the elastic temperature range of the substrate and the temperature of the replication surface within the heat combination region is set to a temperature or a temperature range in the plastic temperature range of the substrate.

12. Apparatus as set forth in claim 11, wherein the position in which the radiation acts on the portion of the replication surface during the irradiation operation and the position of the contact region between the replication surface and the substrate are arranged in overlapping relationship and/or in the direction of rotation of the replication roller with a spacing angle of a magnitude of less than 30°.

13. Apparatus as set forth in claim 11, wherein the radiation for producing the at least one shaping region is fed through the counterpressure apparatus or parts of the counterpressure apparatus.

14. Apparatus as set forth in claim 11, wherein the counterpressure apparatus, in the region of the counterpressure surface, is transparent for the radiation.

15. Apparatus as set forth in claim 11, wherein the counterpressure apparatus is in the form of a counterpressure roller.

16. Apparatus as set forth in claim 11, wherein the counterpressure apparatus is completely or portion-wise in the form of a hollow body.

17. Apparatus as set forth in claim 16, wherein the hollow body is a hollow glass cylinder having a cylinder wall which is transparent for the radiation.

18. Apparatus as set forth in claim 11, wherein the device for producing the radiation and/or a beam deflection unit is arranged within the counterpressure apparatus or within the replication roller.

19. Apparatus as set forth in claim 11, wherein the radiation for producing the shaping regions is fed through the substrate.

20. Apparatus as set forth in claim 11, wherein there is provided an apparatus for temperature control of the replication surface, namely a cooling apparatus for cooling the replication surface.

21. Apparatus as set forth in claim 11, wherein the heating apparatus is provided for heating the replication surface.

22. Apparatus as set forth in claim 11, wherein a marking comprising surface structurings which act diffractively or holographically is producible by the surface structurings of the replication surface.

23. Apparatus as set forth in claim 11, wherein a marking comprising a matt structure which scatters diffusely or directedly is producible by the surface structurings of the replication surface.

24. Apparatus as set forth in claim 11, wherein a marking comprising surface structurings which act diffractively or holographically is produced by the surface structurings of the replication surface.

25. Apparatus as set forth in claim 11, wherein a marking comprising a matt structure which scatters diffusely or directedly is produced by the surface structurings of the replication surface.

26. Apparatus as set forth in claim 11, wherein the substrate is a transfer film.

27. Apparatus as set forth in claim 11, wherein the controllable energy source is a laser installation.

28. Apparatus for producing a marking on a substrate comprising:
   a replication apparatus which is in the form of a replication roller, wherein a replication surface having surface structurings is provided on an outside of the replication roller,
   a controllable energy source for producing a radiation wherein the radiation for producing at least one shaping region is directed on to at least one portion of the replication surface, and
   a counterpressure apparatus which has a counterpressure surface, wherein the substrate is arrangeable between the replication surface of the replication apparatus and the counterpressure surface of the counterpressure apparatus in order to shape the shaping region on to the substrate in a contact region between the replication surface and the substrate,
   wherein there is provided an additional controllable energy source in the form of a heating apparatus for temperature control of the replication surface,
   wherein at least two portions of the replication surface are settable to different temperatures by an energy input of radiation from the energy source and an energy input from the heating apparatus into the replication surface so that at least one portion of the replication surface is in the form of a heat combination region,
   wherein the marking is formable by shaping the shaping region on the substrate,
   wherein the portion of the replication surface which is in the form of the heat combination region directly and/or indirectly forms the shaping region, and
   wherein the radiation for producing the at least one shaping region is fed through the counterpressure apparatus or parts of the counterpressure apparatus.

29. Apparatus for producing a marking on a substrate comprising:
   a replication apparatus which is in the form of a replication roller, wherein a replication surface having surface structurings is provided on an outside of the replication roller,
   a controllable energy source for producing a radiation wherein the radiation for producing at least one shaping region is directed on to at least one portion of the replication surface, and
   a counterpressure apparatus which has a counterpressure surface, wherein the substrate is arrangeable between the replication surface of the replication apparatus and the counterpressure surface of the counterpressure apparatus in order to shape the shaping region on to the substrate in a contact region between the replication surface and the substrate,
   wherein there is provided an additional controllable energy source in the form of a heating apparatus for temperature control of the replication surface,
   wherein at least two portions of the replication surface are settable to different temperatures by an energy input of radiation from the energy source and an energy input from the heating apparatus into the replication surface so that at least one portion of the replication surface is in the form of a heat combination region,
   wherein the marking is formable by shaping the shaping region on the substrate,
   wherein the portion of the replication surface which is in the form of the heat combination region directly and/or indirectly forms the shaping region, and
   wherein the counterpressure apparatus, in the region of the counterpressure surface, is transparent for the radiation.

30. Apparatus for producing a marking on a substrate comprising:
   a replication apparatus which is in the form of a replication roller, wherein a replication surface having surface structurings is provided on an outside of the replication roller,
   a controllable energy source for producing a radiation wherein the radiation for producing at least one shaping region is directed on to at least one portion of the replication surface, and
   a counterpressure apparatus which has a counterpressure surface, wherein the substrate is arrangeable between the replication surface of the replication apparatus and the counterpressure surface of the counterpressure apparatus in order to shape the shaping region on to the substrate in a contact region between the replication surface and the substrate,
   wherein there is provided an additional controllable energy source in the form of a heating apparatus for temperature control of the replication surface wherein at least two portions of the replication surface are settable to different temperatures by an energy input of radiation from the energy source and an energy input from the heating apparatus into the replication surface so that at least one portion of the replication surface is in the form of a heat combination region, wherein the marking is formable by shaping the shaping region on the substrate, wherein the portion of the replication surface which is in the form of the heat combination region directly and/or indirectly forms the shaping region, and wherein the counterpressure apparatus is completely or portion-wise in the form of a hollow body.

* * * * *

UNITED STATES PATENT AND TRADEMARK OFFICE
CERTIFICATE OF CORRECTION

| | |
|---|---|
| PATENT NO. | : 7,357,075 B2 |
| APPLICATION NO. | : 10/524226 |
| DATED | : April 15, 2008 |
| INVENTOR(S) | : Lutz |

Page 1 of 1

It is certified that error appears in the above-identified patent and that said Letters Patent is hereby corrected as shown below:

ON THE TITLE PAGE:

(73) Assignee:  now reads "Leonard Kurz GmbH & Co. KG" should read --Leonhard Kurz GmbH & Co. KG--

IN THE CLAIMS:

Column 17, line 57,  now reads "area and!or in point" should read --area and/or in point--

Signed and Sealed this

Nineteenth Day of August, 2008

JON W. DUDAS
*Director of the United States Patent and Trademark Office*